(12) United States Patent
Tseng et al.

(10) Patent No.: US 11,720,277 B2
(45) Date of Patent: Aug. 8, 2023

(54) CONTROL SYSTEM AND CONTROL METHOD FOR CONTROLLING STORAGE DEVICE

(71) Applicant: Wiwynn Corporation, New Taipei (TW)

(72) Inventors: Yahsuan Tseng, New Taipei (TW); Kai-Sheng Chen, New Taipei (TW); Yi-Hao Chen, New Taipei (TW); Chung Fu Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 127 days.

(21) Appl. No.: 17/529,273

(22) Filed: Nov. 18, 2021

(65) Prior Publication Data
US 2023/0076006 A1  Mar. 9, 2023

(30) Foreign Application Priority Data
Aug. 24, 2021  (TW) ................................. 110131341

(51) Int. Cl.
*G06F 12/00* (2006.01)
*G06F 3/06* (2006.01)
*H03K 19/20* (2006.01)

(52) U.S. Cl.
CPC .......... *G06F 3/0655* (2013.01); *G06F 3/0604* (2013.01); *G06F 3/0673* (2013.01); *H03K 19/20* (2013.01)

(58) Field of Classification Search
CPC .... G06F 3/0655; G06F 3/0604; G06F 3/0673; G06F 21/60; H03K 19/20
See application file for complete search history.

(56) References Cited

U.S. PATENT DOCUMENTS

| | | | |
|---|---|---|---|
| 2008/0162854 A1* | 7/2008 | Hashimoto | G11C 29/42 714/E11.038 |
| 2011/0133715 A1* | 6/2011 | Zushi | H03K 17/0822 323/285 |
| 2012/0124420 A1* | 5/2012 | Yamagami | G06F 11/0787 714/E11.114 |
| 2012/0265974 A1* | 10/2012 | Shen | G06F 1/24 713/1 |
| 2017/0168909 A1* | 6/2017 | Kobashi | G06F 11/2069 |
| 2020/0319955 A1* | 10/2020 | Yamasaki | G06F 11/0793 |

* cited by examiner

*Primary Examiner* — John A Lane
(74) *Attorney, Agent, or Firm* — JCIPRNET (57) ABSTRACT

A control system and a control method are provided. The control system provides a first setting signal in response to an abnormal read-write operation performed on at least one storage device. The control system generates a first state signal having a first logic value in response to the first setting signal and latches the first state signal, and disables the at least one storage device on which the abnormal read-write operation is performed in response to the first state signal having the first logic value. The control system includes a restart input module. The restart input module converts the first logic value of the latched first state signal into a second logic value, so that the control system restarts the at least one storage device disabled in response to the first state signal having the second logic value.

20 Claims, 5 Drawing Sheets

CONTROL SYSTEM AND CONTROL METHOD FOR CONTROLLING STORAGE DEVICE

CROSS-REFERENCE TO RELATED APPLICATION

This application claims the priority benefit of Taiwan application serial no. 110131341, filed on Aug. 24, 2021. The entirety of the above-mentioned patent application is hereby incorporated by reference herein and made a part of this specification.

BACKGROUND OF THE INVENTION

Field of the Invention

The invention relates to a control system and a control method, and more particularly to a control system and a control method for a storage device.

Description of Related Art

In the current information explosion stage, important data stored in storage devices often become a coveted target for those with ill intentions (for example, hackers). People with ill intentions are becoming more and more savvy. In order to improve the security level of information and improve the security of protecting data stored in storage devices, the invention of a new data protection mechanism is needed.

SUMMARY OF THE INVENTION

The invention provides a control system and a control method for a storage device that may improve the security of data stored in the storage device.

A control system of an embodiment of the invention is adapted to control at least one storage device. The control system includes a host, a first controller, a determining circuit, a second controller, and a restart input module. The host is configured to generate an abnormal signal in respond to an abnormal read-write operation performed on the at least one storage device. The first controller is coupled to the host. The first controller provides a first setting signal in response to the abnormal signal. The determining circuit is coupled to the first controller. The determining circuit generates a first state signal having a first logic value and latches the first state signal in response to the first setting signal. The determining circuit provides a first control signal in response to the first state signal having the first logic value. The second controller is coupled to the determining circuit and the at least one storage device. The second controller disables the at least one storage device on which the abnormal read-write operation is performed in response to the first control signal. The restart input module is coupled to the determining circuit. The restart input module converts the first logic value of the first state signal latched in the determining circuit into a second logic value, so that the determining circuit provides a second control signal in response to the first state signal having the second logic value. The second controller restarts the at least one storage device on which the abnormal read-write operation is performed in response to the second control signal.

A control method of an embodiment of the invention is adapted to control at least one storage device. The control method includes: detecting that an abnormal read-write operation is performed on the at least one storage device, and generating an abnormal signal correspondingly; providing a first setting signal by a first controller in response to the abnormal signal; generating a first state signal having a first logic value and latching the first state signal by a determining circuit in response to the first setting signal; providing a first control signal in response to the first state signal having the first logic value; disabling the at least one storage device on which the abnormal read-write operation is performed by a second controller in response to the first control signal; operating a restart input module to convert the first logic value of the first state signal latched in the determining circuit into a second logic value; providing a second control signal by the determining circuit in response to the first state signal having the second logic value; and restarting the at least one storage device on which the abnormal read-write operation is performed by the second controller in response to the second control signal.

Based on the above, when it is detected that the abnormal read-write operation is performed on a storage device, the control system and the control method generate a first state signal having a first logic value and latch the first state signal, so as to disable the storage device on which the abnormal read-write operation is performed. The restart input module is operated to convert the first logic value of the first state signal latched in the determining circuit into a second logic value, thereby restarting the storage device on which the abnormal read-write operation is performed. In other words, when the abnormal read-write operation is performed on the storage device, the control system and the control method disable the storage device on which the abnormal read-write operation is performed based on the latched first logic value until the restart input module is operated. In this way, the security of the data stored in the storage device may be improved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A portion of the embodiments of the invention is described in detail hereinafter with reference to figures. In the following, the same reference numerals in different figures should be considered to represent the same or similar elements. These embodiments are only a portion of the disclosure and do not disclose all of the possible implementations of the disclosure. More precisely, these embodiments are only examples in the claims of the invention.

Figure 1:
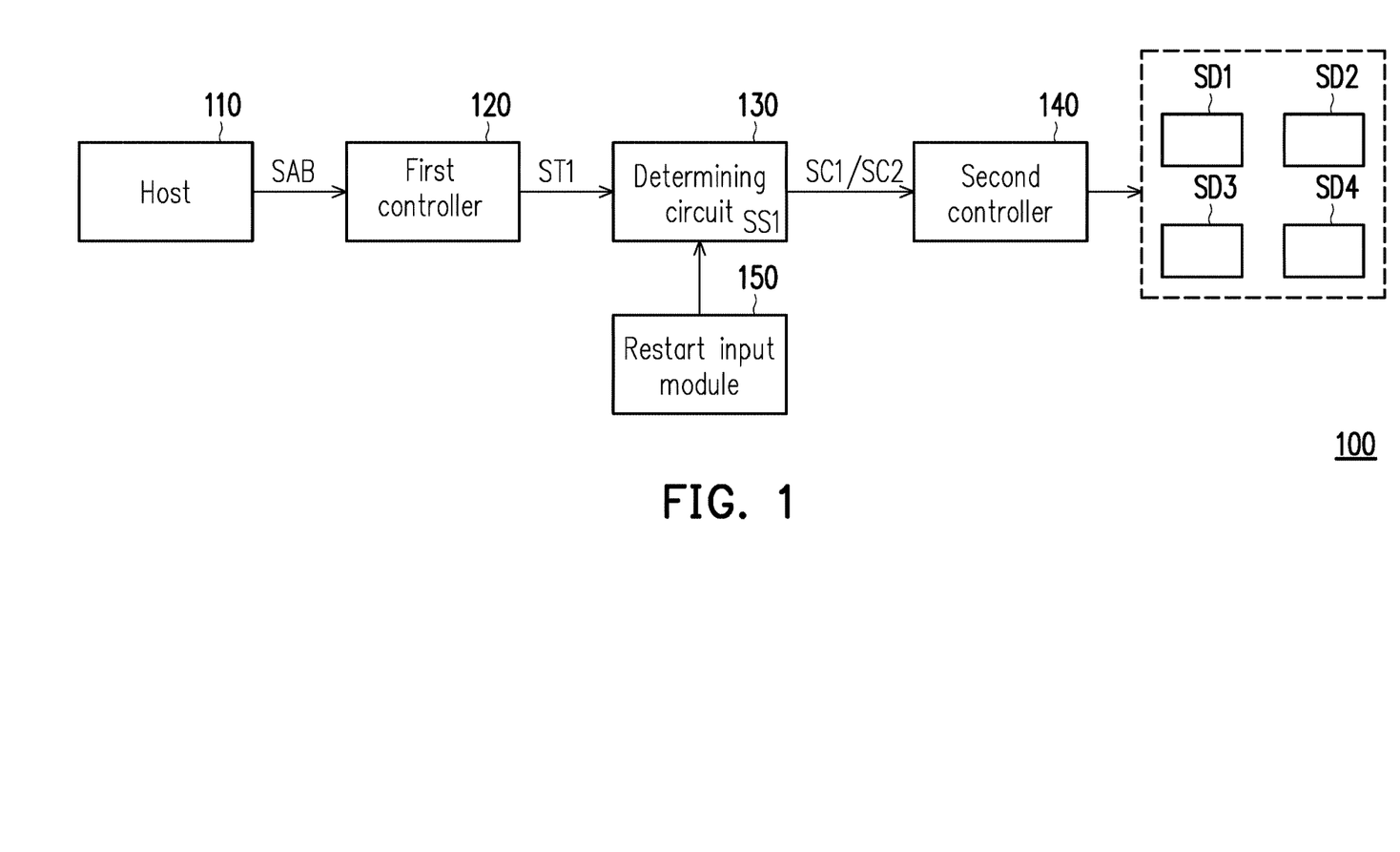
FIG. 1 is a schematic diagram of a control system shown according to an embodiment of the invention.

Referring to FIG. 1, FIG. 1 is a schematic diagram of a control system shown according to an embodiment of the invention. In an embodiment, a control system 100 is adapted to control a storage device 200. Storage devices SD1 to SD4 may be non-volatile memory devices. The control system 100 includes a host 110, a first controller 120, a determining circuit 130, a second controller 140, and a restart input module 150. The host 110 generates an abnormal signal SAB in response to an abnormal read-write operation performed on at least one of the storage devices SD1 to SD4. The first controller 120 is coupled to the host 110. The first controller 120 provides a first setting signal ST1 in response to the abnormal signal SAB. The determining circuit 130 is coupled to the first controller 120. The determining circuit 130 generates a first state signal SS1 having a first logic value in response to the first setting signal ST1. The determining circuit 130 further latches the first state signal SS1. In other words, when it is determined that an abnormal read-write operation is performed on at least one of the storage devices SD1 to SD4, the determining circuit 130 latches the first state signal SS1 having the first logic value. Moreover, the determining circuit 130 further provides a first control signal SC1 in response to the first state signal SS1 having the first logic value.

The second controller 140 is coupled to the determining circuit 130 and the storage devices SD1 to SD4. The second controller 140 disables the storage device in the storage devices SD1 to SD4 on which the abnormal read-write operation is performed in response to the first control signal SC1.

In an embodiment, the restart input module 150 is coupled to the determining circuit 130. The restart input module 150 is operated to convert the first logic value of the first state signal SS1 latched in the determining circuit 130 into a second logic value. The determining circuit 130 provides a second control signal SC2 in response to the first state signal SS1 having the second logic value. In an embodiment, the restart input module 150 may be one of a physical key, a physical button, and a physical switch. The second controller 140 restarts the storage device in the storage devices SD1 to SD4 on which the abnormal read-write operation is performed in response to the second control signal SC2.

In an embodiment, when it is detected that an abnormal read-write operation is performed on at least one of the storage devices SD1 to SD4, the control system 100 generates the first state signal SS1 having the first logic value and latches the first state signal SS1, so as to disable the storage device on which the abnormal read-write operation is performed. The restart input module 150 is operated (for example, pressed or clicked) to convert the first logic value of the first state signal SS1 latched in the determining circuit into the second logic value, thereby restarting the disabled storage device. In other words, when the abnormal read-write operation is performed on the storage device, the control system 100 continuously disables the storage device on which the abnormal read-write operation is performed based on the first logic value of the latched first state signal SS1 until the operator physically operates the restart input module 150 on site. In this way, the security of the data stored in the storage devices SD1 to SD4 may be improved.

In an embodiment, the first controller 120, the determining circuit 130, the second controller 140, and the storage devices SD1 to SD4 may be integrated in a server. In an embodiment, the restart input module 150 may be mounted on a server or on a cabinet of the server. In an embodiment, the host 110 may be a background monitoring device or a monitoring device disposed in a server.

For ease of description, the present embodiment takes four storage devices SD1 to SD4 as an example. The number of storage devices of the invention may be one or a plurality, and is not limited to the present embodiment.

In some embodiments, when it is detected that an abnormal read-write operation is performed on at least one of the storage devices SD1 to SD4, all the storage devices SD1 to SD4 are continuously disabled based on the latched first logic value.

The implementation of the host 110 detecting the abnormal read-write operation is further exemplified. For example, a trap file is loaded into the storage devices SD1 to SD4. The trap file may be stored in a specific folder. When the trap file stored in the storage device SD1 is used (such as copying, changing, moving, or deleting), the host 110 determines that an abnormal read-write operation is performed on the storage device SD1.

As another example, the data transmission flow of the storage devices SD1 to SD4 in a specific time interval is restricted. When the data transmission flow of the storage device SD2 in a specific time interval exceeds the flow threshold, the host 110 determines that an abnormal read-write operation is performed on the storage device SD1. When the data transmission flow of the storage device SD2 in a specific time interval exceeds the flow threshold, the host 110 determines that an abnormal read-write operation is performed on the storage device SD1. When the storage device SD2 is formatted unexpectedly, the host 110 determines that an abnormal read-write operation is performed on the storage device SD2.

As another example, a password is set. When the data of the storage devices SD1 to SD4 is to be used, the control system 100 requires the user to enter a password. The host 110 determines whether an abnormal read-write operation occurs according to the number of consecutive incorrect password input. When the number of consecutive incorrect password input is greater than a threshold, the host 110 determines that an abnormal read-write operation is performed on the storage devices SD1 to SD4 according to the number of consecutive incorrect password input.

Figure 2:
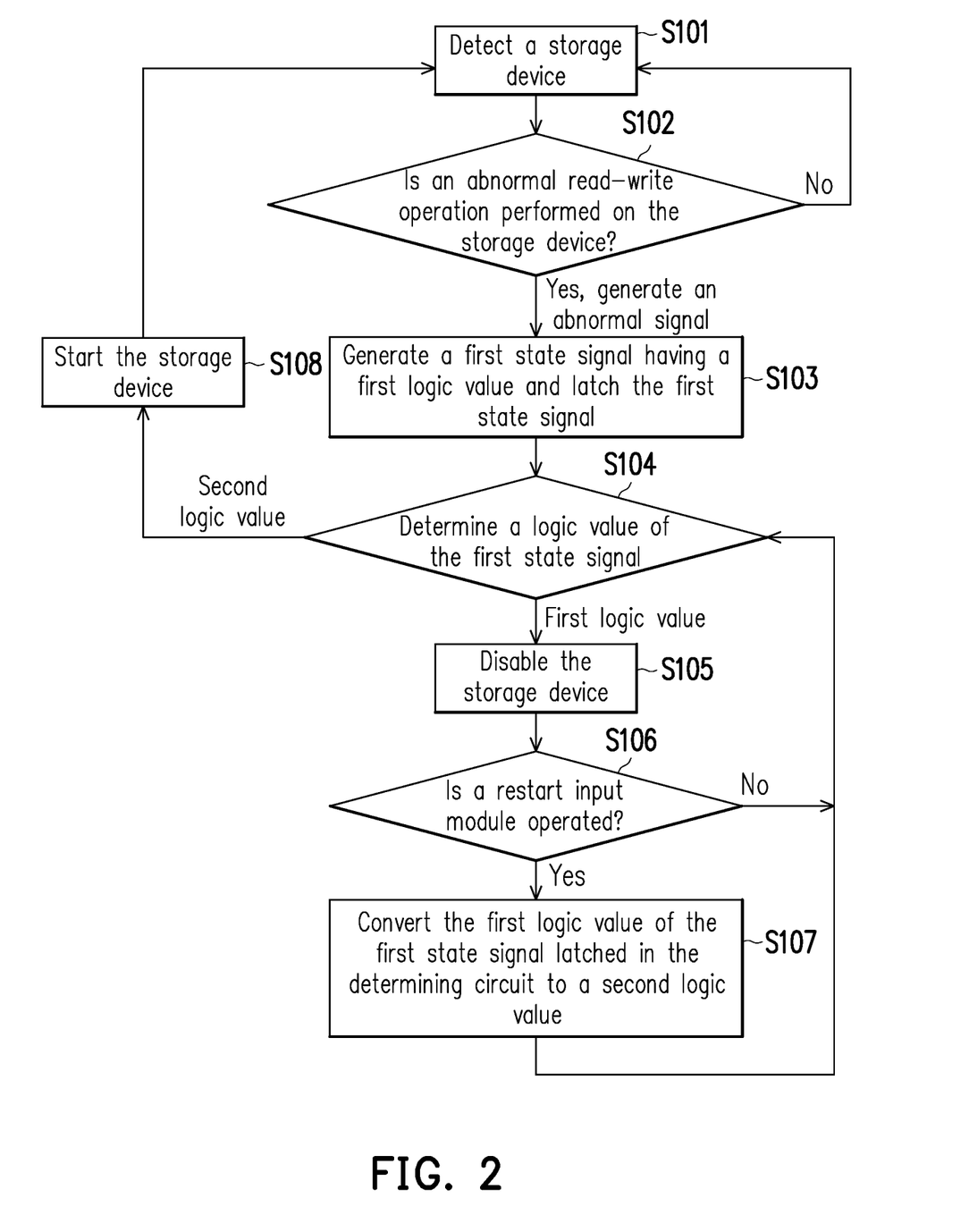
FIG. 2 is a flowchart of a control method shown according to an embodiment of the invention.

Please refer to FIG. 1 and FIG. 2 at the same time. FIG. 2 is a method flowchart of a control method shown according to an embodiment of the invention. In step S101, the storage devices SD1 to SD4 are detected. In step S102, it is determined whether an abnormal read-write operation is performed on the storage devices SD1 to SD4. In step S102, when it is determined that an abnormal read-write operation is not performed on any of the storage devices SD1 to SD4, the control method returns to step S101. That is to say, in the case of no abnormal read-write operations, the control method loops steps S101 and S102. Moreover, when it is determined that an abnormal read-write operation is performed on at least one of the storage devices SD1 to SD4, the abnormal signal SAB is generated. In addition, the control method proceeds to step S103.

In step S103, the first state signal SS1 having the first logic value is generated. In addition, the first state signal SS1 is latched. In step S104, the logic value of the first state signal SS1 is determined. When the logic value of the first state signal SS1 is the first logic value, the control method proceeds to step S105 to disable the storage device in the storage devices SD1 to SD4 on which the abnormal read-write operation is performed.

In step S106, whether the restart input module 150 is operated is determined. When the restart input module 150 is not operated, the control method returns to step S104. In other words, when the logic value of the first state signal SS1 is the first logic value and the restart input module 150 is not operated, the control method loops steps S104 to S106. Moreover, when the restart input module 150 is operated, the latched first logic value of the first state signal SS1 is converted into a second logic value in step S107. Next, the control method returns to step S104.

In step S104, when the logic value of the first state signal SS1 is the second logic value, the storage device on which the abnormal read-write operation is performed is started in step S108. The control method returns to step S101.

In an embodiment, steps S101 and S102 may be performed by the host 110. In an embodiment, step S103 may be performed by the cooperative operation of the first controller 120 and the determining circuit 130. In an embodiment, steps S104 to S108 may be performed by the cooperative operation of the determining circuit 130 and the second controller 140. The implementation details of the host 110, the first controller 120, the determining circuit 130, and the second controller 140 may be sufficiently taught from the embodiment of FIG. 1 and therefore are not repeated herein.

Figure 3:
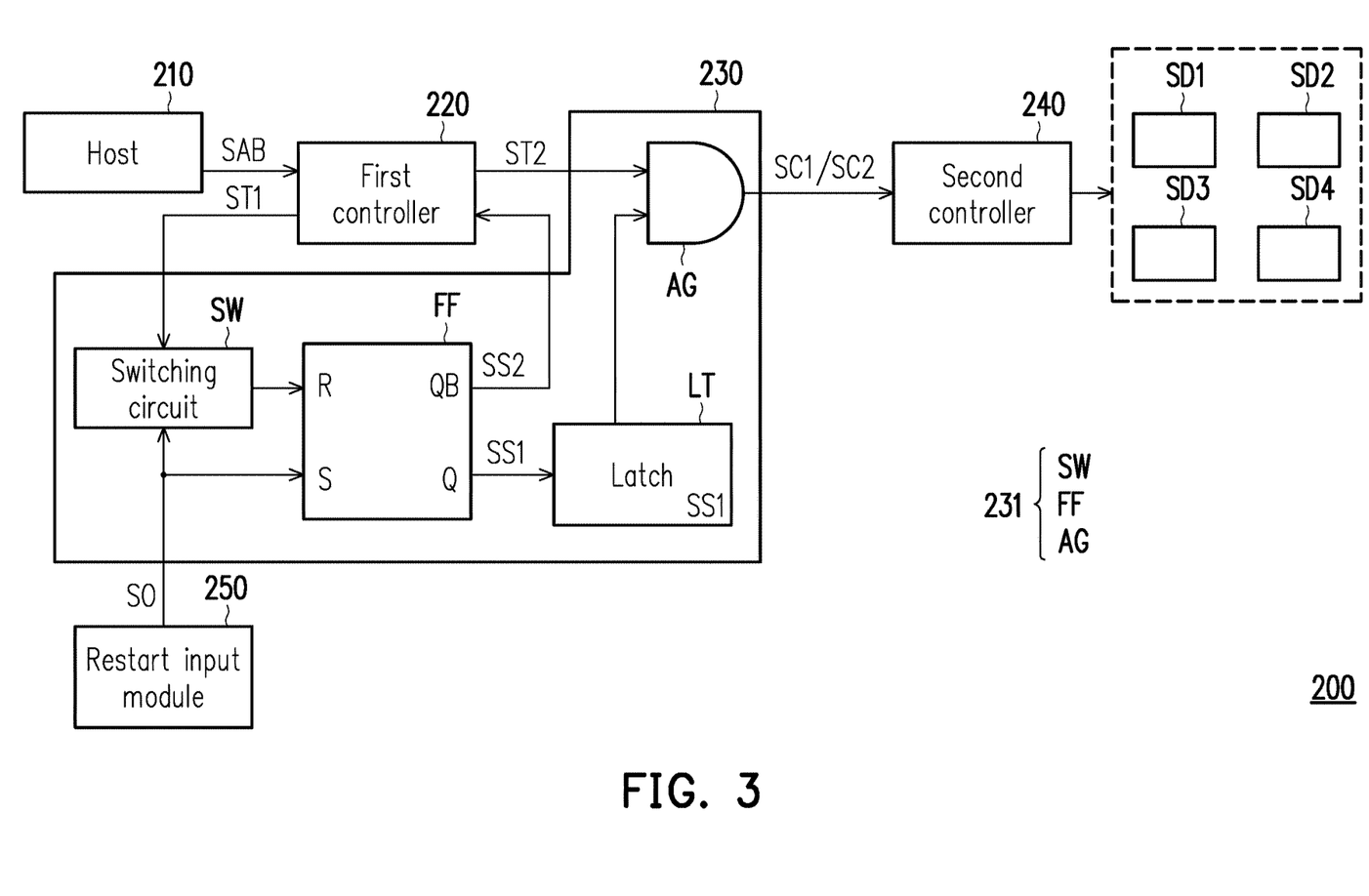
FIG. 3 is a schematic diagram of a control system shown according to an embodiment of the invention.

Referring to FIG. 3, FIG. 3 is a schematic diagram of a control system shown according to an embodiment of the invention. In an embodiment, the control system 200 includes a host 210, a first controller 220, a determining circuit 230, a second controller 240, and a restart input module 250. The host 210 generates the abnormal signal SAB in response to an abnormal read-write operation performed on at least one of the storage devices SD1 to SD4.

In a case that the abnormal signal SAB is not generated, the first controller 220 provides the first setting signal ST1 having the first logic value and the second setting signal ST2 having the second logic value. The first logic value is a low logic value (i.e., logic 0). The second logic value is a high logic value (i.e., logic 1). Moreover, when the abnormal signal SAB is generated, the first controller 220 provides the first setting signal ST1 having the second logic value and the second setting signal ST2 having the first logic value in response to the abnormal signal SAB.

In an embodiment, the restart input module 250 generates an operation signal SO having the first logic value when not operated. When the restart input module 250 is operated, the operation signal SO having the second logic value is generated. The determining circuit 230 provides the first state signal SS1 having the first logic value and a second state signal SS2 having the second logic value in response to the first setting signal ST1 and the operation signal SO having the first logic value. Moreover, the determining circuit 230 provides the first state signal SS1 having the second logic value and the second state signal SS2 having the first logic value in response to the operation signal SO having the second logic value. The first controller 220 provides the second setting signal ST2 having the second logic value in response to the second state signal SS2 having the first logic value. In an embodiment, when the restart input module 250 is operated, the first controller 220 is triggered in response to the second state signal SS2 having the first logic value, so as to reset the second logic value of the first setting signal ST1 back to the first logic value. Moreover, the first logic value of the second setting signal ST2 is reset back to the second logic value. In some embodiments, the first controller 220 is triggered in response to a falling edge of the second state signal SS2 to reset the logic value of the first setting signal ST1 and the logic value of the second setting signal ST2.

Furthermore, the determining circuit 230 includes a latch LT and a logic circuit 231. The latch LT latches the first state signal SS1. The logic circuit 231 provides the first control signal SC1 in response to the first state signal SS1 and the second setting signal ST2 latched in the latch LT. In an embodiment, the logic circuit 231 includes a switching circuit SW, a flip-flop FF, and an AND gate AG. The first input terminal of the switching circuit SW is coupled to the first controller 220. The first input terminal of the switching circuit SW receives the first setting signal ST1. The second input terminal of the switching circuit SW is coupled to the reference low voltage (for example, ground). The control terminal of the switching circuit SW receives the operation signal SO. A setting terminal S of the flip-flop FF receives the operation signal SO. A reset terminal R of the flip-flop FF is coupled to the output terminal of the switching circuit SW. An output terminal Q of the flip-flop FF is coupled to the latch LT. An inverting output terminal QB of the flip-flop FF is coupled to the first controller 220. The flip-flop FF may be implemented by an RS flip-flop.

In an embodiment, the switching circuit SW switches the reset terminal R of the flip-flop to the first controller 220 in response to the operation signal SO having the first logic value. The switching circuit SW switches the reset terminal R of the flip-flop to the reference low voltage in response to the operation signal SO having the second logic value. Therefore, the truth table provided by the first setting signal ST1, the operation signal SO, and the flip-flop FF is as shown in Table 1.

TABLE 1

| State | ST1 | SO | R | S | Q (SS1) | QB (SS2) |
|---|---|---|---|---|---|---|
| State 1 | 0 | 0 | 0 | 0 | Previous logic value maintained | |
| State 2 | 0 | 1 | 0 | 1 | 1 | 0 |
| State 3 | 1 | 0 | 1 | 0 | 0 | 1 |
| State 4 | 1 | 1 | 0 | 1 | 1 | 0 |

Table 1 shows the four possible states of an embodiment. In State 1, an abnormal read-write operation is not performed on the storage devices SD1 to SD4. The logic value of the first setting signal ST1 is logic 0. The restart input module 250 is not operated. The logic value of the operation signal SO is logic 0. That is, the logic value of the first setting signal ST1 is the same as the logic value of the operation signal SO. Therefore, the logic value of the reset terminal R and the logic value of the setting terminal S are both logic 0. The logic value of the first state signal SS1 maintains the previous logic value. The logic value of the second state signal SS2 maintains the previous logic value.

In State 2, an abnormal read-write operation is not performed on the storage devices SD1 to SD4. The logic value of the first setting signal ST1 is logic 0. The restart input module 250 is operated. The logic value of the operation signal SO is logic 1. The logic value of the first setting signal ST1 is different from the logic value of the operation signal SO. Therefore, the logic value of the reset terminal R is logic 0. The logic value of the setting terminal S is logic 1. The logic value of the first state signal SS1 is logic 1. The logic value of the second state signal SS2 is logic 0. Based on the above, when an abnormal read-write operation is not performed on the storage devices SD1 to SD4, the operation of the restart input module 250 does not affect the logic value of the first state signal SS1 and the logic value of the second state signal SS2. The storage devices SD1 to SD4 may be operated normally.

In State 3, an abnormal read-write operation is performed on at least one of the storage devices SD1 to SD4. The logic value of the first setting signal ST1 is logic 1. The restart input module 250 is not operated. The logic value of the operation signal SO is logic 0. The logic value of the first setting signal ST1 is different from the logic value of the operation signal SO. Therefore, the logic value of the reset terminal R is logic 1. The logic value of the setting terminal S is logic 0. The logic value of the first state signal SS1 is logic 0. The logic value of the second state signal SS2 is logic 1. Therefore, the storage device on which the abnormal read-write operation is performed is disabled. In other words, when the first setting signal ST1 having the second logic value (i.e., logic 1) is provided, the flip-flop FF responds to the first setting signal ST1 and the operation signal SO having the first logic value (i.e., logic 0). Therefore, the output terminal Q of the flip-flop FF provides the first state signal SS1 having the first logic value (i.e., logic 0), and the inverting output terminal of the flip-flop FF provides the second state signal SS2 having the second logic value (i.e., logic 1).

In State 4, an abnormal read-write operation is performed on at least one of the storage devices SD1 to SD4. The logic value of the first setting signal ST1 is logic 1. The restart input module 250 is operated. The logic value of the operation signal SO is logic 1. The logic value of the first setting signal ST1 is the same as the logic value of the operation signal SO. Therefore, the logic value of the reset terminal R is logic 0. The logic value of the setting terminal S is logic 1. The logic value of the first state signal SS1 is logic 1. The logic value of the second state signal SS2 is logic 0. Therefore, the storage device on which the abnormal read-write operation is performed is started. In addition, the logic value of the first setting signal ST1 is reset back to logic 0. In other words, the flip-flop FF makes the output terminal of the flip-flop FF provide the first state signal SS1 having the second logic value (i.e., logic 1) and makes the inverting output terminal of the flip-flop FF provide the second state signal SS2 having the first logic value (i.e., logic 0) in response to the operation signal SO having the second logic value (i.e., logic 1) and the reference low voltage.

In an embodiment, the first input terminal of the AND gate AG is coupled to the first controller 220 to receive the second setting signal ST2. The second input terminal of the AND gate AG is coupled to the latch LT to receive the first state signal SS1. The output terminal of the AND gate AG is coupled to the first controller 220. The truth table provided by the second setting signal ST2, the first state signal SS1, and the AND gate AG is as shown in Table 2.

TABLE 2

| State | ST2 | SS1 | Output terminal of AND gate AG |
|---|---|---|---|
| State A | 1 | 1 | 1 (second control signal SC2) |
| State B | 0 | 1 | 0 (first control signal SC1) |
| State C | 0 | 0 | 0 (first control signal SC1) |
| State D | 1 | 0 | 0 (first control signal SC1) |

State A is normal state. In other words, the initial logic value of the first state signal SS1 is logic 1. The initial logic value of the second setting signal ST2 is logic 1. That is, the initial logic value of the first state signal SS1 is the same as the initial logic value of the second setting signal ST2. Therefore, the AND gate AG performs a logic AND operation on the first state signal SS1 and the second setting signal ST2 to provide the second control signal SC2 having the second logic value. At this point, the logic value of the second control signal SC2 is the same as the initial logic value of the first state signal SS1 and the initial logic value of the second setting signal ST2. In other words, the determining circuit 230 provides the second control signal SC2 in response to the second setting signal ST2 having the second logic value and the first state signal SS1 having the second logic value. In other words, the AND gate AG provides the second control signal SC2 having the second logic value in response to the second setting signal ST2 having the second logic value and the first state signal SS1 having the second logic value. Therefore, the second controller 240 drives the storage devices SD1 to SD4 in response to the second control signal SC2.

In State B, an abnormal read-write operation is performed on at least one of the storage devices SD1 to SD4. The logic value of the second setting signal ST2 is changed to logic 0. Next, the logic value of the first state signal SS1 is changed to logic 0 in State C. Therefore, in States B and C, the AND gate AG performs a logic AND operation on the first state signal SS1 and the second setting signal ST2 to provide the first control signal SC1. In other words, the determining circuit 230 provides the first control signal SC1 having the first logic value in response to at least one of the second setting signal ST2 having the first logic value and the first state signal SS1 having the first logic value. The second controller 240 disables the storage device on which the abnormal read-write operation is performed in response to the first control signal SC1.

In States B and C, when the restart input module 250 is operated, the logic value of the first state signal SS1 is changed to logic 1. The logic value of the second setting signal ST2 is changed to logic 1. The determining circuit 230 provides the second control signal SC2. Therefore, the second controller 240 starts the disabled storage device (that is, the storage device on which an abnormal read-write operation is performed previously) in response to the second control signal SC2.

In State D, the first controller 220 may be maliciously modified, so that the logic value of the second setting signal ST2 is changed to logic 1. However, the logic 0 of the first state signal SS1 is latched. Therefore, the AND gate AG still provides the first control signal SC1. It is worth mentioning here that, based on the configuration of the determining circuit 230, operating the restart input module 250 is the only way to change the logic 0 of the latched first state signal SS1 to logic 1. As a result, people with ill intentions may not use remote control to start a storage device on which an abnormal read-write operation is performed.

Figure 4:
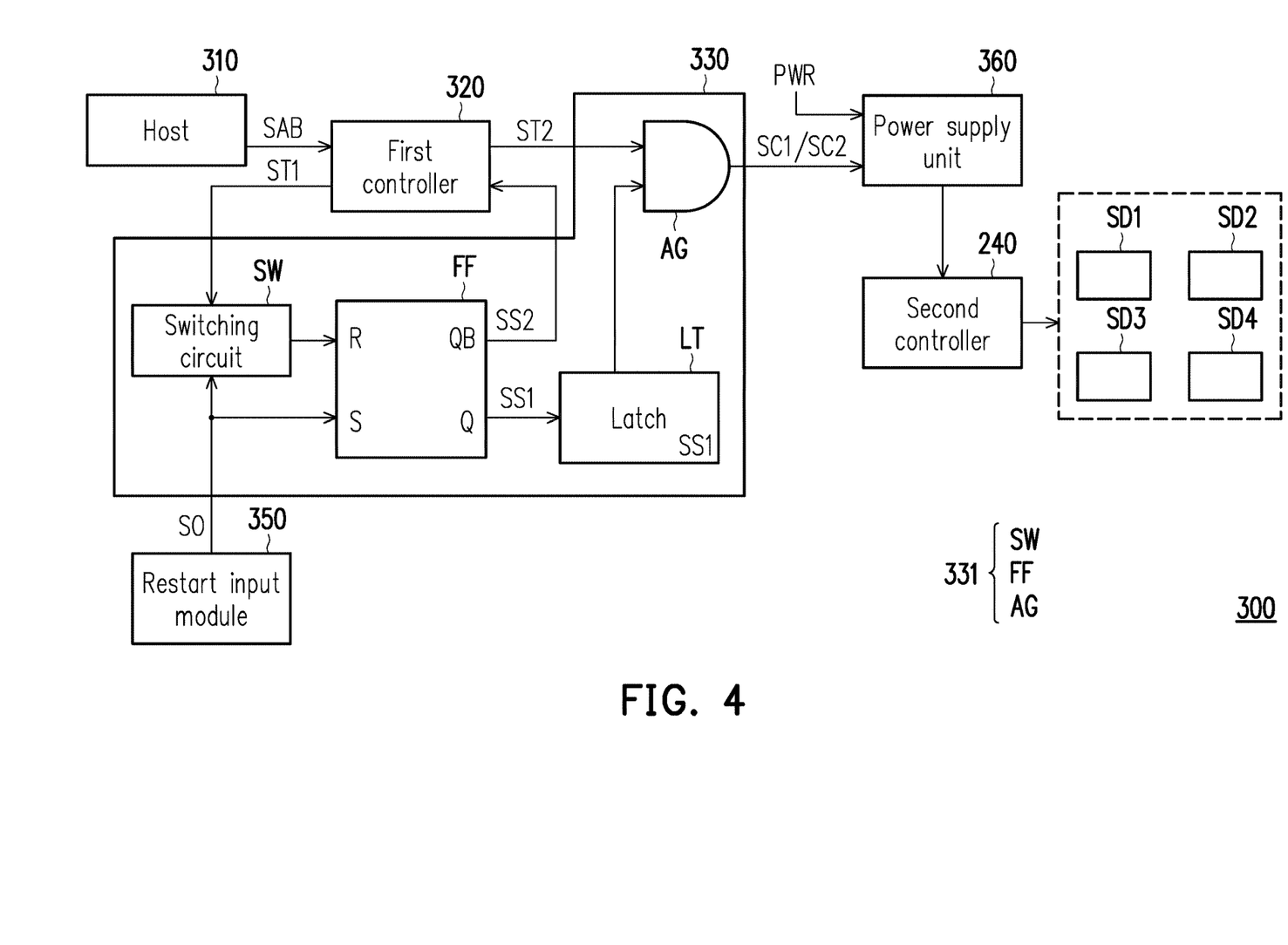
FIG. 4 is a schematic diagram of a control system shown according to an embodiment of the invention.

Referring to FIG. 4, FIG. 4 is a schematic diagram of a control system shown according to an embodiment of the invention. In an embodiment, a control system 300 includes a host 310, a first controller 320, a determining circuit 330, a second controller 340, a restart input module 350, and a power supply unit 360. In an embodiment, the implementation details of the host 310, the first controller 320, the determining circuit 330, and the restart input module 350 may be sufficiently taught from the embodiment of FIG. 3 and therefore are not repeated herein. In an embodiment, the power supply unit 360 is coupled to the determining circuit 330 and the second controller 340. The power supply unit 360 makes the second controller 340 stop receiving a power PWR in response to the first control signal SC1. Therefore, the second controller 340 may not drive the storage devices SD1 to SD4 using the power PWR. Moreover, the power supply unit 360 makes the second controller 340 receive the power PWR in response to the second control signal SC2. Therefore, the second controller 340 may drive the storage devices SD1 to SD4 using the power PWR. The power supply unit 360 is implemented by a switching circuit, for example.

In some embodiments, the second controller 340 may be driven based on the power PWR. Therefore, when the first control signal SC1 is provided, the storage devices SD1 to SD4 and the second controller 340 are all disabled.

Figure 5:
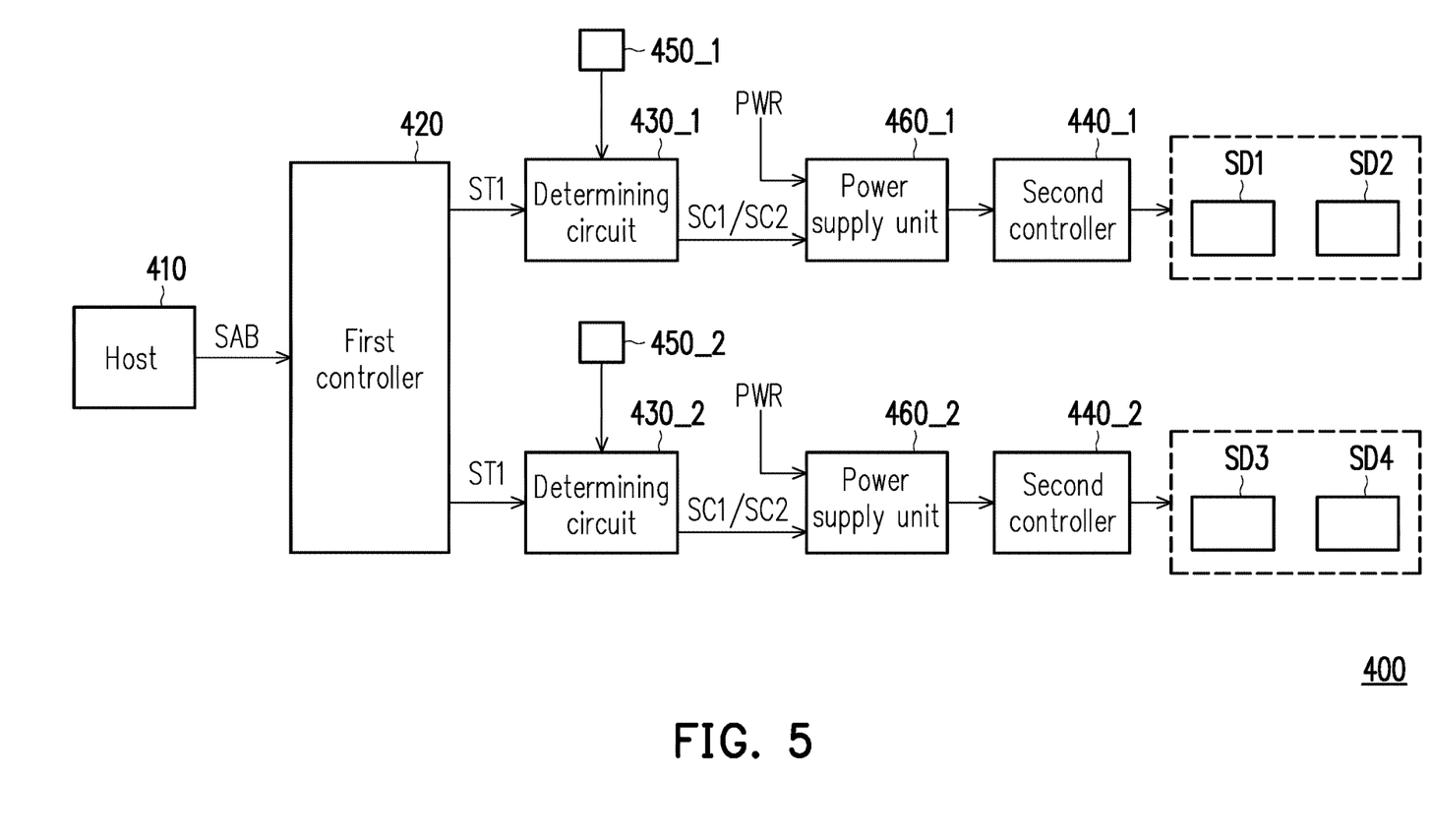
FIG. 5 is a schematic diagram of a control system shown according to an embodiment of the invention.

Referring to FIG. 5, FIG. 5 is a schematic diagram of a control system shown according to an embodiment of the invention. In an embodiment, a control system 400 includes a host 410, a first controller 420, determining circuits 430 and 430_2, second controllers 440_1 and 440_2, restart input modules 450_1 and 450_2, and power supply units 460_1 and 460_2. The determining circuit 430_1, the second controller 440_1, the restart input module 450_1, and the power supply unit 460_1 are configured as a first control group to control the storage devices SD1 and SD2. The determining circuit 430_2, the second controller 440_2, the restart input module 450_2, and the power supply unit 460_2 are configured as a second control group to control the storage devices SD3 and SD4.

The implementation of the first control group and/or the second control group may be sufficiently taught from the embodiments of FIG. 3 and FIG. 4, and is therefore not repeated herein.

The control system of the invention may include a plurality of control groups, and is not limited to the first control group and the second control group in an embodiment of the invention. The number of storage devices corresponding to the control groups in an embodiment of the invention may be one or a plurality, and is not limited to the present embodiment.

In an embodiment, for example, when an abnormal read-write operation is performed on the storage devices SD1 and SD2, the control system 400 may only disable the storage devices SD1 and SD2. The storage devices SD3 and SD4 may run continuously.

According to actual usage requirements, the control system 400 may only expand the number of control groups without adding the host 410 and the first controller 420. Therefore, the control system 400 may be used to control more storage devices.

In some embodiments, at least one of the first control group and the second control group may be implemented by the determining circuit 230, the second controller 240, and the restart input module 250 as shown in FIG. 3.

Based on the above, when it is detected that an abnormal read-write operation is performed on a storage device, the control system and the control method generate a first state signal having a first logic value and latch the first state signal, so that the storage device on which the abnormal read-write operation is performed is disabled. When the restart input module is operated, the storage device on which the abnormal read-write operation is performed may be started. In this way, the security of the data stored in the storage device may be improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A control system, for controlling at least one storage device, comprising:
   a host, configured to generate an abnormal signal in response to an abnormal read-write operation performed on the at least one storage device;
   a first controller, coupled to the host, configured to provide a first setting signal in response to the abnormal signal;
   a determining circuit, coupled to the first controller, configured to generate a first state signal having a first logic value in response to the first setting signal and latch the first state signal, wherein the determining circuit provides a first control signal in response to the first state signal having the first logic value;
   a second controller, coupled to the determining circuit and the at least one storage device, configured to disable the at least one storage device on which the abnormal read-write operation is performed in response to the first control signal; and
   a restart input module, coupled to the determining circuit, configured to convert the first logic value of the first state signal latched in the determining circuit into a second logic value, so that the determining circuit provides a second control signal in response to the first state signal having the second logic value,
   wherein the second controller restarts the at least one storage device on which the abnormal read-write operation is performed in response to the second control signal.

2. The control system of claim 1, wherein the restart input module is one of a physical key, a physical button, and a physical switch.

3. The control system of claim 1, wherein the first controller provides a second setting signal having the first logic value in response to the abnormal signal, wherein the determining circuit comprises:
   a latch, configured to latch the first state signal; and
   a logic circuit, configured to provide the first control signal in response to the first state signal and the second setting signal.

4. The control system of claim 3, wherein:
   the logic circuit comprises an AND gate,
   the first logic value is a low logic value,
   the second logic value is a high logic value, and
   the logic circuit provides the first control signal having the first logic value in response to at least one of the first state signal having the first logic value and the second setting signal having the first logic value.

5. The control system of claim 3, wherein:
   the restart input module generates an operation signal having the first logic value when not operated,
   the restart input module generates the operation signal having the second logic value when operated, and
   the determining circuit provides the first state signal having the first logic value in response to the first setting signal and the operation signal having the first logic value.

6. The control system of claim 5, wherein:
   the determining circuit provides the first state signal having the second logic value and provides a second state signal having the first logic value in response to the operation signal having the second logic value, and
   the first controller provides the second setting signal having the second logic value in response to the second state signal having the first logic value.

7. The control system of claim 3, wherein the determining circuit further comprises:
   a switching circuit, wherein a first input terminal of the switching circuit is coupled to the first controller, a second input terminal of the switching circuit is coupled to a reference low voltage, and a control terminal of the switching circuit receives the operation signal; and a flip-flop, wherein a setting terminal of the flip-flop receives the operation signal, a reset terminal of the flip-flop is coupled to an output terminal of the switching circuit, an output terminal of the flip-flop is coupled to the latch, and an inverting output terminal of the flip-flop is coupled to the first controller.

8. The control system of claim 7, wherein:
the switching circuit switches the reset terminal of the flip-flop to the first controller in response to the operation signal having the first logic value,
the first setting signal has the second logic value, and
when the first setting signal is provided, the flip-flop makes the output terminal of the flip-flop provide the first state signal having the first logic value and makes the inverting output terminal of the flip-flop provide the second state signal having the second logic value in response to the first setting signal and the operation signal having the first logic value.

9. The control system of claim 7, wherein:
the switching circuit switches the reset terminal of the flip-flop to the reference low voltage in response to the operation signal having the second logic value,
the flip-flop makes the output terminal of the flip-flop provide the first state signal having the second logic value and makes the inverting output terminal of the flip-flop provide the second state signal having the first logic value in response to the operation signal having the second logic value and the reference low voltage, and
the first controller provides the second setting signal having the second logic value in response to the second state signal having the first logic value.

10. The control system of claim 9, wherein the determining circuit provides the second control signal in response to the second setting signal having the second logic value and the first state signal having the second logic value.

11. The control system of claim 1, further comprising:
a power supply unit, coupled to the determining circuit and the second controller, configured to make the second controller stop receiving a power in response to the first control signal and make the second controller receive the power in response to the second control signal.

12. A control method, for controlling at least one storage device, comprising:
detecting that an abnormal read-write operation is performed on the at least one storage device, and generating an abnormal signal correspondingly;
providing a first setting signal by a first controller in response to the abnormal signal;
generating a first state signal having a first logic value and latching the first state signal by a determining circuit in response to the first setting signal;
providing a first control signal in response to the first state signal having the first logic value;
disabling the at least one storage device on which the abnormal read-write operation is performed by a second controller in response to the first control signal;
operating a restart input module to convert the first logic value of the first state signal latched in the determining circuit into a second logic value;
providing a second control signal by the determining circuit in response to the first state signal having the second logic value; and
restarting the at least one storage device on which the abnormal read-write operation is performed by the second controller in response to the second control signal.

13. The control method of claim 12, wherein the restart input module is one of a physical key, a physical button, and a physical switch.

14. The control method of claim 12, further comprising:
providing a second setting signal having the first logic value by the first controller in response to the abnormal signal.

15. The control method of claim 14, wherein the determining circuit comprises a latch and a logic circuit, wherein the step of providing the first control signal in response to the first state signal having the first logic value comprises:
latching the first state signal by the latch; and
providing the first control signal by the logic circuit in response to the first state signal and the second setting signal having the first logic value.

16. The control method of claim 15, wherein the logic circuit comprises a gate, the first logic value is a low logic value, and the second logic value is a high logic value, wherein the step of providing the first control signal by the logic circuit in response to the first state signal and the second setting signal having the first logic value comprises:
providing the first control signal having the first logic value by the logic circuit in response to the first state signal having the first logic value and the second setting signal having the first logic value.

17. The control method of claim 15, wherein the restart input module generates an operation signal having the first logic value when not operated, wherein the restart input module generates the operation signal having the second logic value when operated, wherein the step of generating the first state signal having the first logic value by the determining circuit in response to the first setting signal comprises:
providing the first state signal having the first logic value by the determining circuit in response to the first setting signal and the operation signal having the first logic value.

18. The control method of claim 17, wherein the step of providing the second control signal by the determining circuit in response to the first state signal having the second logic value comprises:
providing the first state signal having the second logic value and providing a second state signal having the first logic value by the determining circuit in response to the operation signal having the second logic value.

19. The control method of claim 18, wherein the step of providing the second control signal by the determining circuit in response to the first state signal having the second logic value further comprises:
providing the second setting signal having the second logic value by the first controller in response to the second state signal having the first logic value; and
providing the second control signal by the determining circuit in response to the second setting signal having the second logic value and the first state signal having the second logic value.

20. The control method of claim 12, further comprising:
making the second controller stop receiving a power in response to the first control signal; and making the second controller receive the power in response to the second control signal.

* * * * *